United States Patent
Hsu

(10) Patent No.: US 8,757,879 B2
(45) Date of Patent: Jun. 24, 2014

(54) ROLLER MAINTAINING CHAIN AND METHOD FOR MAKING ROLLER MAINTAINING CHAIN AND LINEAR MOVEMENT DEVICE

(75) Inventor: Ming-Che Hsu, Tainan (TW)

(73) Assignee: Chieftech Precision Co., Ltd., Tainan (TW)

( * ) Notice: Subject to any disclaimer, the term of this patent is extended or adjusted under 35 U.S.C. 154(b) by 259 days.

(21) Appl. No.: 13/475,018

(22) Filed: May 18, 2012

(65) Prior Publication Data

US 2013/0305852 A1 Nov. 21, 2013

(51) Int. Cl.
*F16C 29/06* (2006.01)
(52) U.S. Cl.
USPC .................................. 384/51; 384/44
(58) Field of Classification Search
USPC ....................................... 384/44, 51
See application file for complete search history.

(56) References Cited

U.S. PATENT DOCUMENTS

| | | | |
|---|---|---|---|
| 8,297,843 B2 * | 10/2012 | Hsu ................................. | 384/45 |
| 8,408,796 B1 * | 4/2013 | Hsu ................................. | 384/45 |
| 2007/0076989 A1 * | 4/2007 | Matsumoto et al. ............ | 384/45 |
| 2008/0019622 A1 * | 1/2008 | Chen .............................. | 384/51 |

* cited by examiner

*Primary Examiner* — Thomas R Hannon
(74) *Attorney, Agent, or Firm* — Muncy, Geissler, Olds & Lowe, P.C.

(57) ABSTRACT

A roller maintaining chain includes an elongate strip having multiple holes separated by separation blocks. Each hole has a hole face perpendicular to the elongate strip. Each separation block has a top separation block and a bottom separation block. Each of the top and bottom separation blocks has an accommodating surface which has a flat surface and an inclined stop surface. A part of each accommodating surface is perpendicular to planes on the axial direction of the elongate strip. The flat surfaces of the top and bottom separation blocks are smoothly connected to each other. The inclined stop surfaces are inclined toward the top direction of the holes to maintain the rollers in the holes. The method for making the roller maintaining chain uses a left mold and a right mold, the two molds are split inclinedly and laterally to obtain the roller maintaining chain.

7 Claims, 9 Drawing Sheets

ROLLER MAINTAINING CHAIN AND METHOD FOR MAKING ROLLER MAINTAINING CHAIN AND LINEAR MOVEMENT DEVICE

FIELD OF THE INVENTION

The present invention relates to a roller maintaining chain and a method for making roller maintaining chain and linear movement device, and more particularly, to a maintain chain maintaining multiple rollers allocated at the chain and the adjacent rollers has a distance defined therebetween. The roller maintaining chain and the rollers provide a circulation path for the linear movement device.

BACKGROUND OF THE INVENTION

The conventional linear movement device includes a longitudinal rail unit and a movable member. The movable member and the rail unit each provide one row of rail. A series of rollers are located between the rails and the rollers are movable on the rails. The movable member provides a return path and two U-turn paths to each rail. The U-turn paths communicate with the return path, the entrance and exit of the rails to form a circulation path. The rollers re-enter the return path via the rail area and then enter the rail area via the return path. By this way, the rollers can move along the circulation path. The movable member then moves endlessly along the rails by the movement of the rollers.

In order to avoid impact between the rollers, the movable member provides a maintaining chain for the rollers. A series of maintaining blocks are located between the rollers and connected by a connection wire such that the maintaining blocks separate the rollers one by one to avoid impact between the rollers. The rollers therefore are maintained a certain distance therebetween and move smoothly without impact.

The rolling members comprise balls and rollers, for the ball maintaining chain, JP05-052217 discloses a ball chain, Taiwan Patent I303696 discloses a rolling members maintaining chain, and Taiwan Patent I294497 discloses a linear rail maintaining member.

The maintaining chain usually needs secondary injection molding or secondary machining and assembling because of de-molding interference. The extra machining processes make the maintaining chain have an uneven surface which may affect the movement of the rolling members.

The applicant invents ball maintaining chain and a method for making ball maintaining chain and linear movement device disclosed in Taiwan Patent Application No. 201122262 which provides a mold set for the ball maintaining chain which is completed by only one injection molding. The invention further provides a method of inclined de-molding so as to eliminate the drawbacks of the conventional methods. The ball maintaining chain is a flat and elongate chain which has holes in the axial direction. There is a plate located between the adjacent holes, and each plate has a top block and a bottom block connected thereto. The top and bottom blocks are partially formed as a spherical surface so as to maintain the balls and guide the balls to move in the correct path.

Taiwan M334223 discloses a linear roller maintaining chain which has two flexible linking portions and multiple even-distanced separation blocks which are located between the linking portions. A room is defined between the two separation blocks and each block has two maintaining blocks. One of the maintaining blocks protrudes upward from the top surface and the adjacent maintaining block protrudes downward from the bottom surface. The respective distal ends of the protrusions are respectively inclined toward the room. Taiwan I288212 discloses a synchronized roller maintaining member and comprises two flexible linking portions and multiple even-distanced separation blocks which are located between the linking portions. A room is defined between the two separation blocks for receiving a roller. Each separation block is composed of two or more than two mainlining blocks. One of the maintaining blocks has a cylindrical maintaining portion and a flat extension portion on two sides thereof. The cylindrical maintaining portions and the flat extension portions on the same side of the maintaining blocks of the same separation block are located corresponding to each other. However, because of the specific shape of the maintaining blocks, there will be two de-molding seams visible on the maintaining block and the seams include surplus material which makes the products have higher defect rate.

Taiwan Patent No. 473595 shows that the roller maintaining chain is accommodated in the recesses defined by the separation plates. The guide belt cannot maintain the rollers which are maintained by the separation plates so that the rollers are not well positioned and tend to shake when in operation.

Taiwan M335587 discloses a synchronized connector for the rollers have two connection wires and multiple first maintaining members and second maintaining members. The first and second maintaining members are installed to the connection wires evenly, and a room is defined between the first maintaining members and between the second maintaining members so as to have lubricant received therein. However, in order to obtain the rooms, slider is used when de-molding and this means high manufacturing cost is involved.

JP2005-069444 discloses "Molding method for roller connection body and mold and molding device used in molding method", wherein a fixed mold and a movable mold are used. The movable mold is de-molded along the top-inclined direction of the maintaining chain, and the resin made maintaining chain left on the fixed mold can be taken out removed by 25 pins extending from the fixed mold. However, the maintaining chain is pushed by the 25 pins in a bent form, instead of straight form. This may damage the maintaining chain.

The present invention intends to provide a roller maintaining chain which is an improvement based on Taiwan Patent Application No. 201122262 and the roller maintaining chain provides a proper maintaining force to the rollers located in the recesses in the chain and does not interfere the movement of the rollers. Furthermore, the method for making the roller maintaining chain that is de-molded in the inclined direction so that the maintaining chain can be obtain by one injection and this simplifies the process for making the roller maintaining chain. The problems of the surplus material and the uneven surface can be improved. In order to form the accommodating surface for maintaining the cylindrical rollers, avoid the de-molding interference, and have a flat surface on a portion of the accommodating surface, the present invention provides a linear movement device.

SUMMARY OF THE INVENTION

The present invention relates to a roller maintaining chain and comprises an elongate strip having multiple holes defined along the axial direction thereof and the holes are separated by separation blocks. Each hole has a hole face which is defined between two adjacent separation blocks and perpendicular to the axial direction of the elongate strip. Each separation block has a top separation block and a bottom separation block. Each of the top and bottom separation blocks has an accommodating surface which is located adjacent to the hole. Each of the accommodating surfaces has a flat surface and an inclined stop surface, wherein a part of each of the accommodating surfaces is perpendicular to planes on the axial direction of the elongate strip. The flat surfaces of the top and bottom separation blocks are smoothly connected to each other. The inclined stop surfaces are inclined toward the top direction of the holes.

Preferably, the inclined stop surfaces are circular and curved surface.

Preferably, the hole face is parallel to the axial direction of the elongate strip.

The method for making the roller maintaining chain comprises a left mold and a right mold. Each of the left and right molds has a first molding portion which inclinedly splits toward hole faces of the elongate strip so as to form a first splitting direction which is located between the vertical plane that is perpendicular to the axial direction of the elongate strip and the transverse plane which is transverse to the axial direction of the elongate strip. The first molding portions have opposite splitting directions and are respectively connected to the second molding portions. The assembly of the first and second molding portions is made by way of injection molding. The first molding portions respectively form the accommodating surfaces of the top separation block and the bottom separation block, the holes and partial shape of the roller maintaining chain. The second molding portions form the rest of the shape of the roller maintaining chain. The first molding portions form a parting line at the holes. The inclined angle of the parting line is not less than the inclined angle of the diagonal line of the cross sectional area of the holes of the elongate strip. The inclined angle of the first splitting direction of the first molding portions is larger than the inclined angle of the parting line.

Preferably, the inclined angle of the first splitting direction of the first molding portions is smaller than the inclined angle of the side of the elongate strip of the roller maintaining chain that is located corresponding to the second molding portions. The second molding portions are integrally connected to the first molding portions.

Preferably, the parting line of the first molding portions is located on the same plane of the side of the elongate strip that is located corresponding to the first molding portions.

Preferably, the linear movement device comprises a guide member which has a first rail on at least one side thereof. A body is mounted to the guide member and has a second rail which is located corresponding to the first rail. Two ends of the second rail are respectively connected to the first end of the turning path. The second end of each turning path is connected with the return-straight path. The second rail, the turning paths and the return-straight path form a circulation path. At least one closed guide groove is located in the circulation path. At least one of the two sides of the elongate strip of the roller maintaining chain is located in the at least one closed guide groove. The holes of the roller maintaining chain each have a roller. The roller maintaining chain and the rollers are movable in the circulation path.

The advantages of the present invention are:
1. The rollers are maintained in the holes in the roller maintaining chain and the rollers are properly restricted and do not interfere the smooth operation thereof.
2. The roller maintaining chain is made during one time of the injection molding by using the left and right molds which split inclinedly and laterally. There is no de-molding interference when the roller maintaining chain is de-molded.
3. There is only one parting line formed on the roller maintaining chain and the chance that the surplus material is generated is low.
4. The roller maintaining chain is made by using the left and right molds which split inclinedly and laterally, no slider is needed so that the product can be easily taken out from the molds and the manufacturing cost is low.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
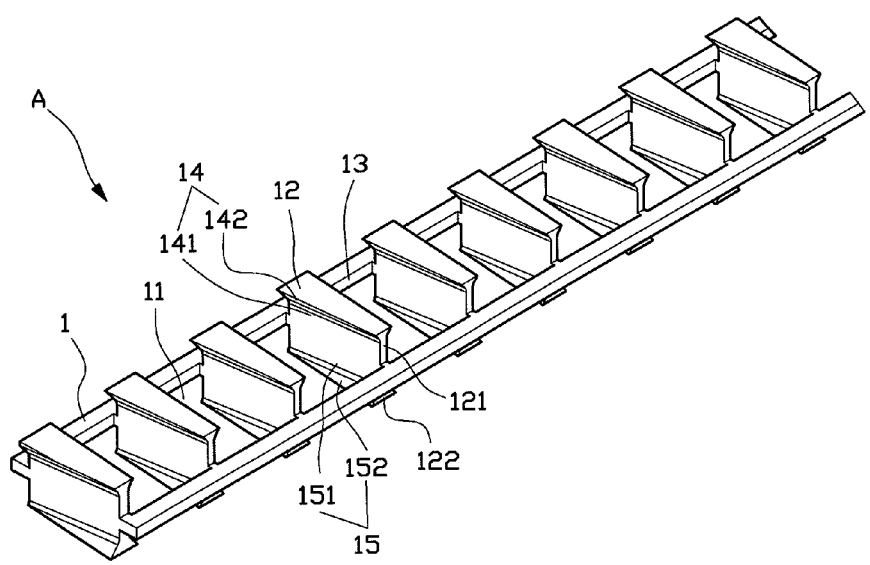
FIG. 1 is a perspective view to show the roller maintaining chain of the present invention.
Figure 2:
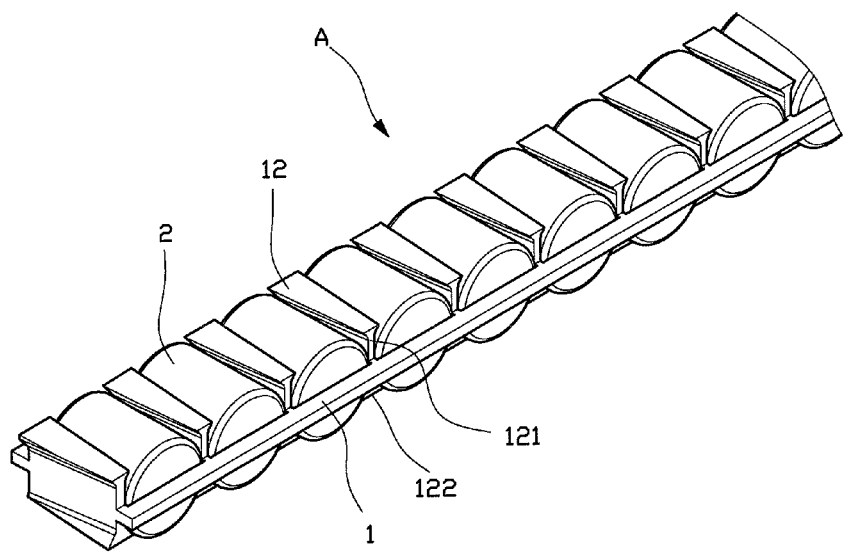
FIG. 2 is a perspective view to show that the rollers are engaged with the holes in the roller maintaining chain of the present invention.

Referring to FIG. 1, the roller maintaining chain "A" of the present invention comprises an elongate strip 1 having multiple holes 11 defined along the axial direction thereof. The holes 11 are separated by separation blocks 12. Each hole 11 has a hole face 13 which is defined between two adjacent separation blocks 12 and perpendicular to the axial direction of the elongate strip 1. The hole face 13 is parallel to an plane that extends along the axial direction of the elongate strip 1. Each separation block 12 has a top separation block 121 and a bottom separation block 122. Each of the top and bottom separation blocks 121, 122 has an accommodating surface 14, 15 which is located adjacent to the hole 11. Each of the accommodating surfaces 14, 15 has a flat surface 141, 151 and an inclined stop surface 142, 152, wherein a part of each of the accommodating surfaces 14, 15 is perpendicular to the flat surfaces 141, 151 on the axial direction of the elongate strip 1. The flat surfaces 141, 151 of the top and bottom separation blocks 121, 122 are smoothly connected to each other. The inclined stop surfaces 142, 152 are inclined toward the top direction of the holes 11. As shown in FIG. 2, a series of rollers 2 are maintained in the holes 11 separated by the separation blocks 12.

Figure 3:
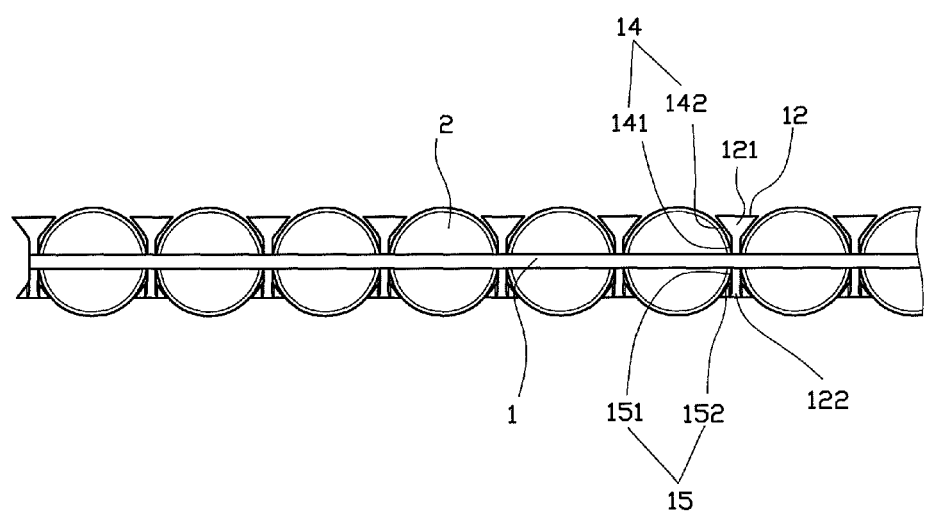
FIG. 3 is a cross sectional view, taken along line A-A of FIG. 2.

As shown in FIG. 3, the flat surfaces 141, 151 of the top separation blocks 121 and the bottom separation blocks 122 are in contact with the rollers 2 by points so that the movement of the rollers 2 are not interfered, and the rollers 2 can be guided forward and the rollers 2 do not shake or vibrate to ensure that the linear movable member moves smoothly. The inclined stop surfaces 142, 152 are circular and curved surface to provide proper restriction force or maintaining force to the rollers 2 which are able to stably rotate in the holes 11.

Figure 4:
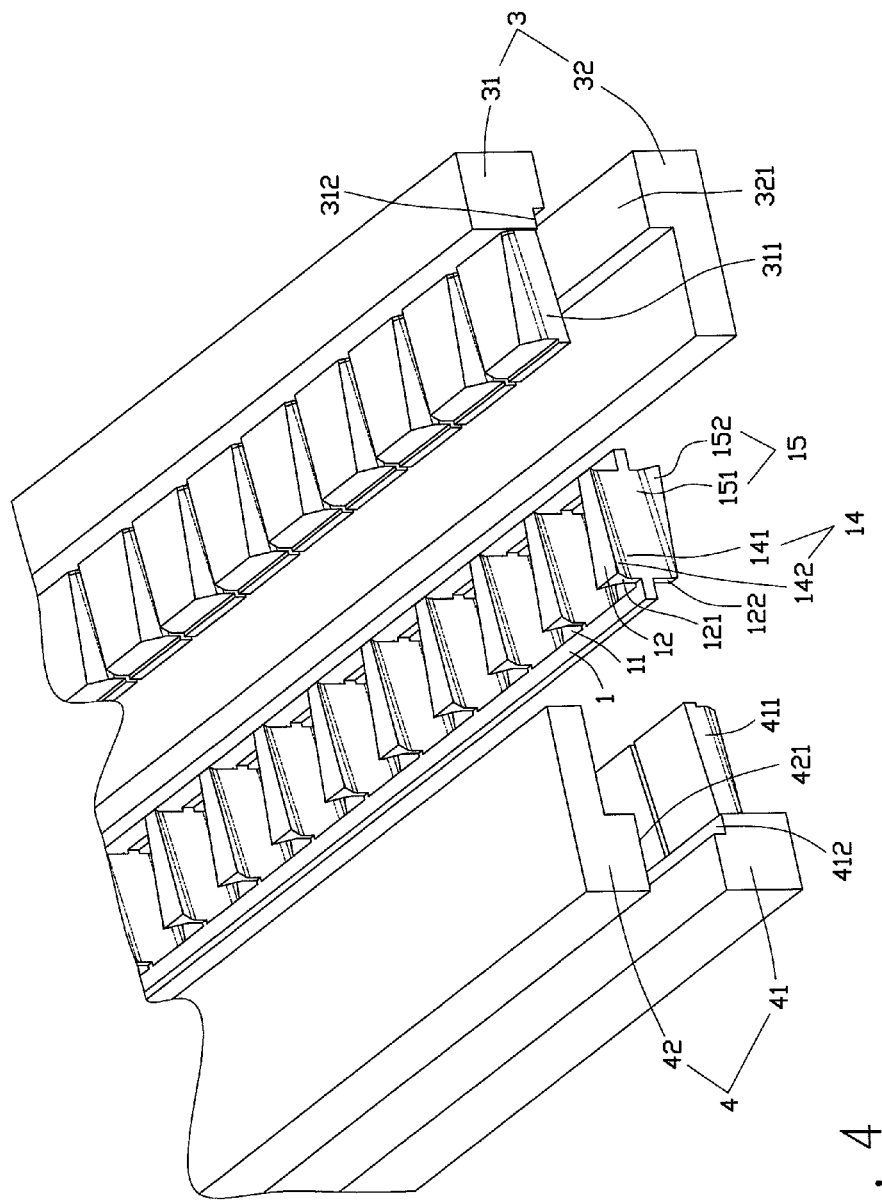
FIG. 4 shows the roller maintaining chain of the present invention and the molds for making the roller maintaining chain.
Figure 5:
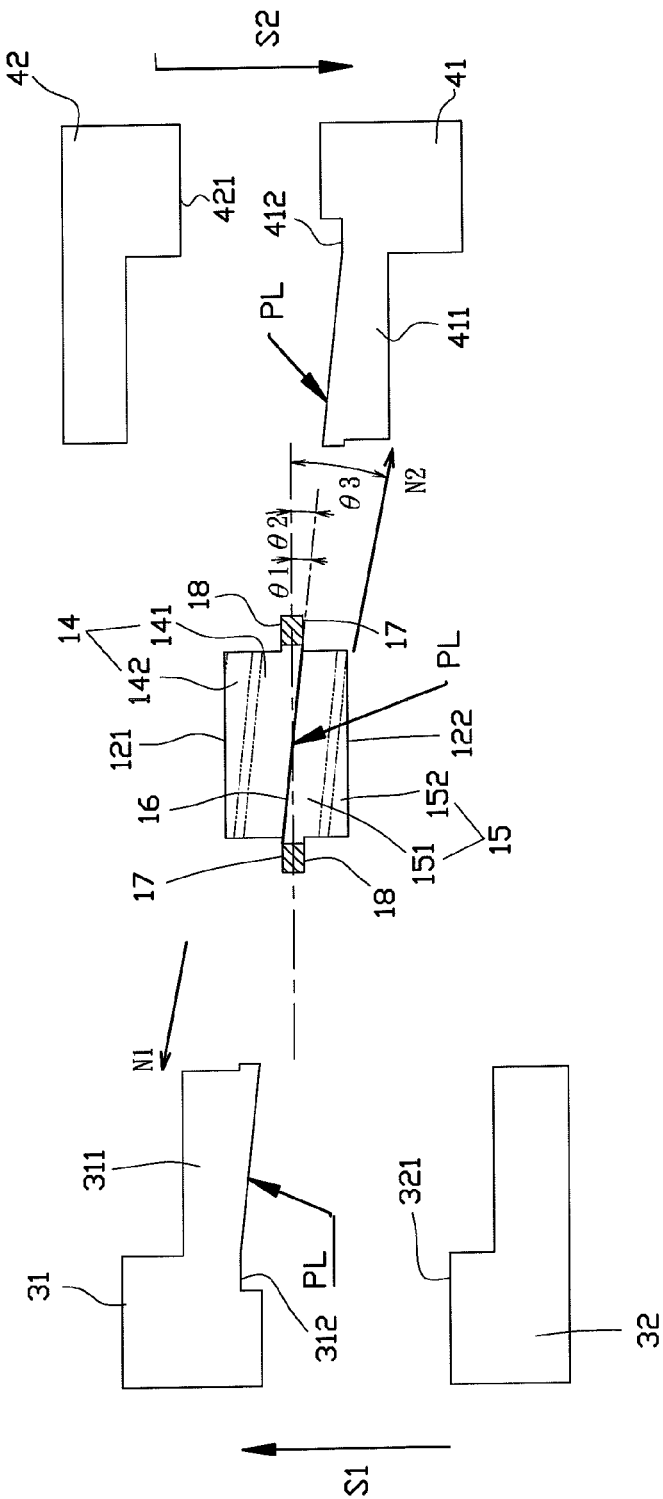
FIG. 5 shows the molds used in the first embodiment of the method of the present invention, wherein the molds split inclinedly and laterally.
Figure 6:
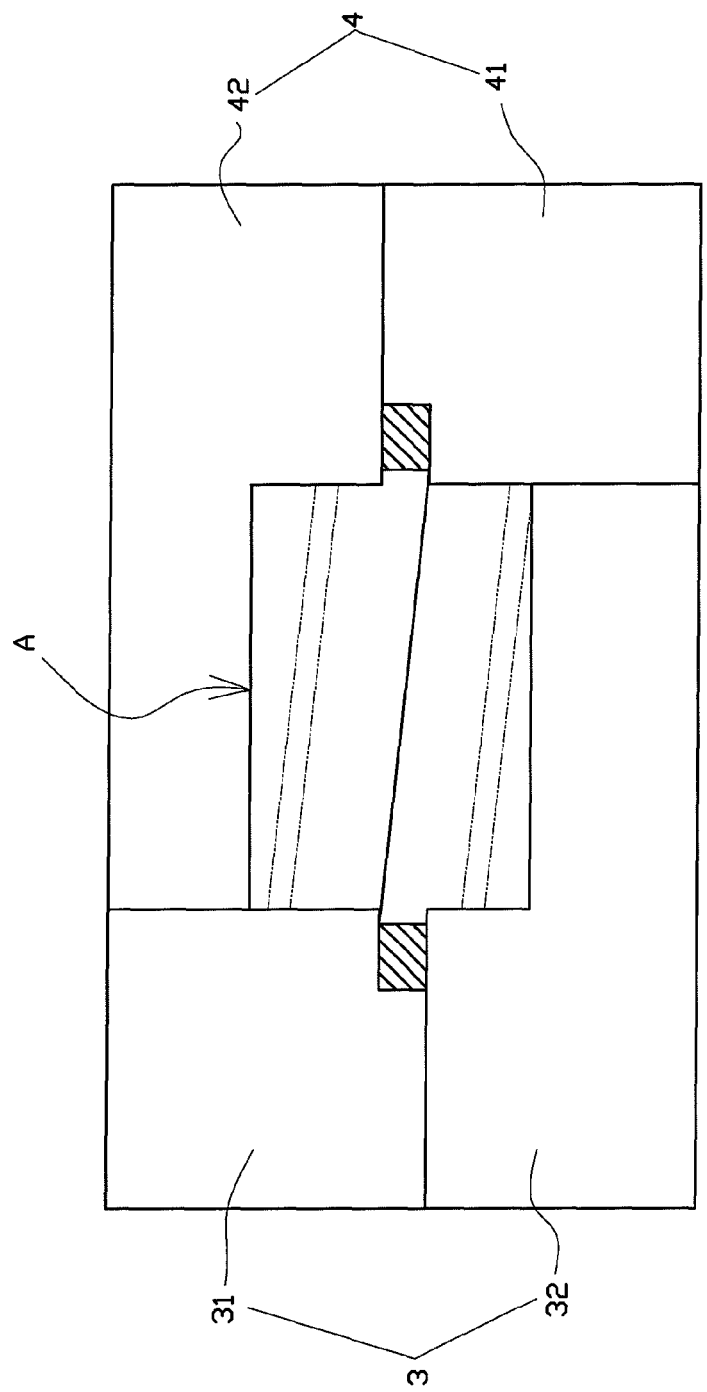
FIG. 6 shows that the left mold and the right mold form cavities for making the roller maintaining chain of the present invention.

As shown in FIGS. 4 and 5, wherein each of the left mold 3 and the right mold 4 has a first molding portion 31, 41 which inclinedly and laterally splits toward hole faces 13 of the elongate strip 1 so as to form a first splitting direction N1, N2 which is located between a vertical plane that is perpendicular to the axial direction of the elongate strip 1 and a transverse plane which is transverse to the axial direction of the elongate strip 1. The first molding portions 31, 41 have opposite splitting directions. As shown in FIG. 6, the first molding portions 31, 41 are respectively connected to the second molding portions 32, 42. The assembly of the first and second molding portions 31, 41, 32, 42 is molded by way of injection molding such that the roller maintaining chain "A" is obtained within one time of injection molding.

Besides, the mold surfaces 311, 411 of the first molding portions 31, 41 are respectively located corresponding to the accommodating surfaces 14, 15, so that the first molding portions 31, 41 are split along the first splitting directions N1, N2 and do not interfere with the accommodating surfaces 14, 15. Because the bottom separation blocks 122 are located in opposite to the top separation blocks 121, the accommodating surfaces 14, 15 of the top and bottom separation blocks 121, 122 are made by way of injection molding from the first molding portions 31, 41 of the left mold 3 and the right mold 4.

As shown in FIG. 5, portions of the first molding portions 31, 41 of the left mold 3 and the right mold 4 that are used to form the accommodating surfaces 14, 15 of the top separation block 121 and the bottom separation block 122 have a parting line "PL" at the holes 11. The inclined angle $\theta 2$ of the parting line "PL" is not less than an inclined angle $\theta 1$ of an diagonal line 16 of the cross sectional area of the holes 11 of the elongate strip 1. That is to say, $\theta 2 >= \theta 1$. In FIG. 5, the embodiment is illustrated when $\theta 2 = \theta 1$. The accommodating surfaces 14, 15 of the top separation block 121 and the bottom separation block 122 and the hole faces 13 of the elongate strip 1 are made by the mold surfaces 311, 411 of the first molding portions 31, 41 of the same molds 3, 4. The mold surfaces 311, 411 of the first molding portions 31, 41 of the molds 3, 4 simultaneously form accommodating surfaces 14, 15 of the top separation block 121 and the bottom separation block 122, the hole faces 13 of the elongate strip 1 and a partial shape of the roller maintaining chain "A". The second molding portions 32, 42 form the rest of the shape of the roller maintaining chain "A".

As shown in FIGS. 5 and 6, the first embodiment of the method for making the roller maintaining chain "A" is disclosed, the inclined angle $\theta 3$ of the first splitting direction N1, N2 of the first molding portions 31, 41 is larger than the inclined angle $\theta 2$ of the parting line "PL". That is to say, when $\theta 3 > \theta 2$, the firs first molding portions 31, 41 are split inclinedly and laterally without interference. When the first molding portions 31, 41 are simultaneously split along the first splitting directions N1, N2, the second molding portions 32, 42 are simultaneously split along the second splitting directions S1, S2.

Figure 7:
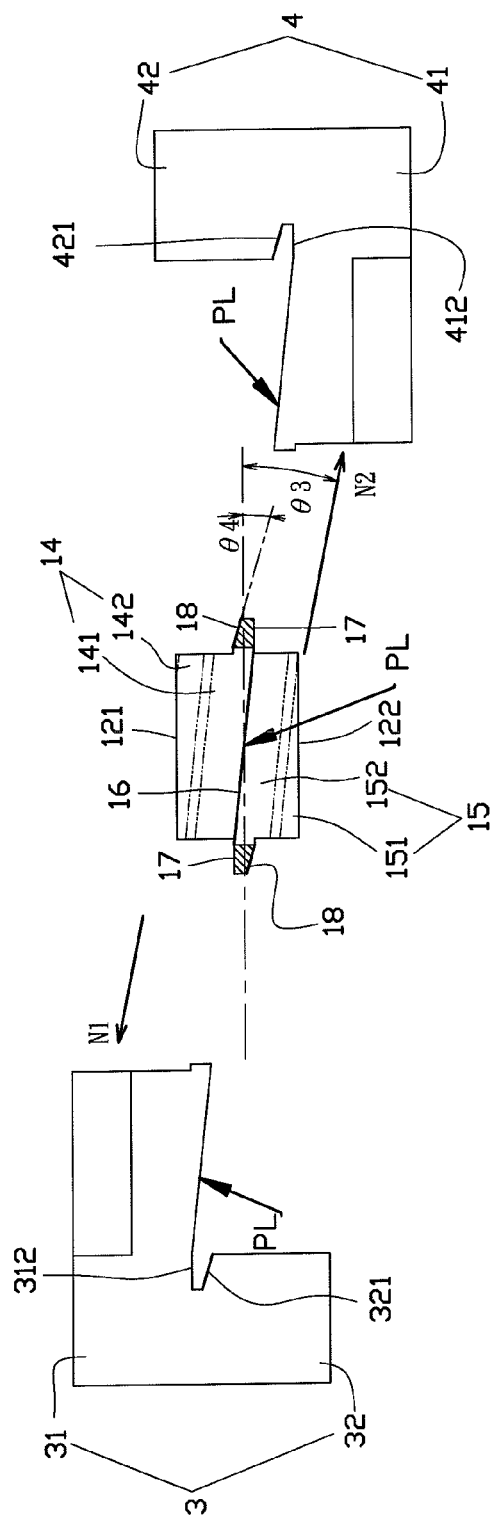
FIG. 7 shows the molds used in the second embodiment of the method of the present invention, wherein the molds split inclinedly and laterally.

As shown in FIG. 7, the second embodiment of the method of the present invention shows that the roller maintaining chain "A" is made in the closed cavities formed by the first and second molding portions 31, 41, 32, 42 of the left and right molds 3, 4. The contact areas between the roller maintaining chain "A" and the first and second molding portions 31, 41, 32, 42 of the left and right molds 3, 4 form two facing sides 17, 18 on two sides of the holes 11 of the elongate strip 1. The first molding portions 31, 41 have the mold surfaces 312, 412 on the side 17. The second molding portions 32, 42 have the mold surfaces 321, 421 on the side 18. When the second molding portions 32, 42 have an inclined angle $\theta 4$ formed on the side 18 of the elongate strip 1 of the roller maintaining chain "A", and the inclined angle $\theta 3$ of the first splitting direction N1, N2 of the first molding portions 31, 41 is smaller than the inclined angle $\theta 4$ of the side 18 of the elongate strip 1 of the roller maintaining chain "A". That is to say, when $\theta 4 > \theta 3$, the second molding portions 32, 42 are integrally connected to the first molding portions 31, 41. The left mold 3 and the right mold 4 can split inclinedly and laterally without interference to obtain the roller maintaining chain "A" in one time of injection molding.

Figure 8:
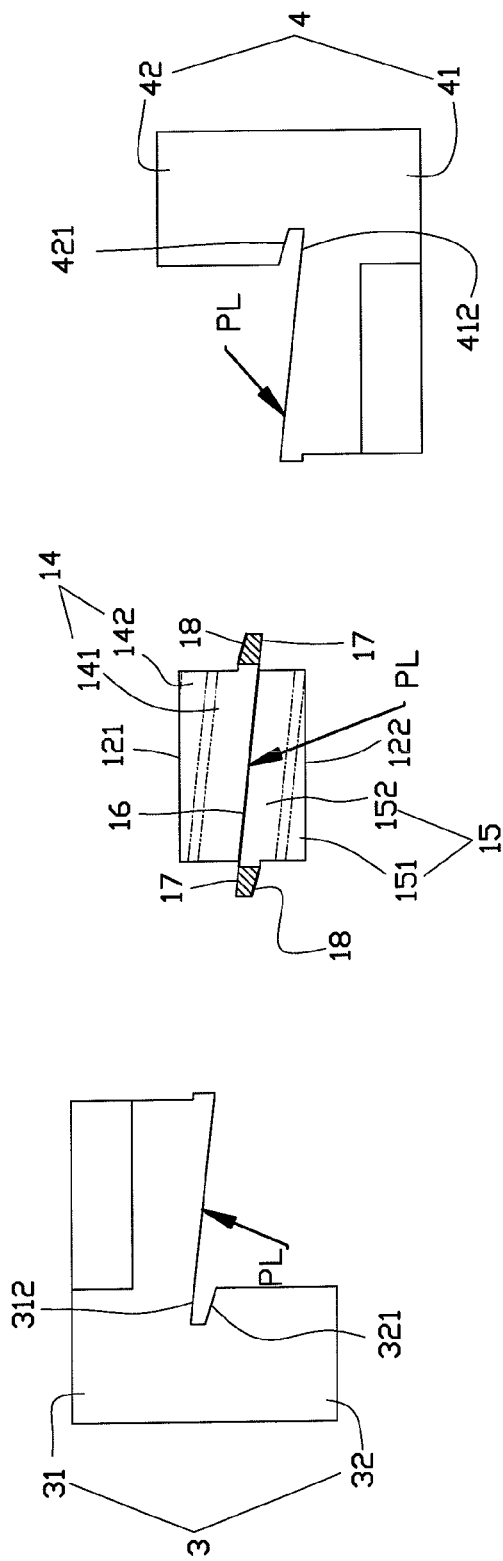
FIG. 8 shows the molds used in the third embodiment of the method of the present invention, wherein the molds split inclinedly and laterally.

As shown in FIG. 8 which shows the third embodiment of the method of the present invention, when the parting line PL and the side 17 formed by the first molding portions 31, 41 are located on the same plane, the molding surfaces 312, 412 of the first molding portions 31, 41 and the parting line PL are located on the same plane. This makes the molds to be easily made and split.

Figure 9:
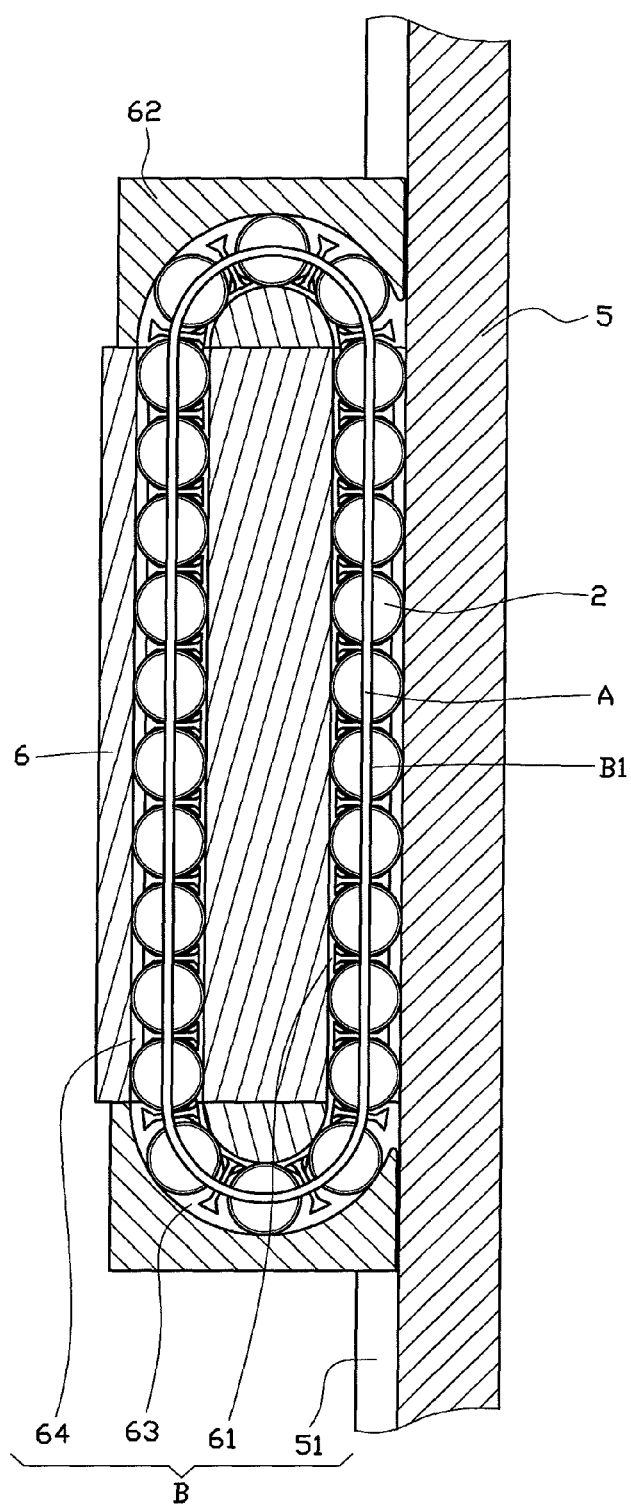
FIG. 9 shows that the roller maintaining chain and the rollers are located in the circulation path of the linear movement device.

As shown in FIG. 9, the roller maintaining chain "A" is used on a linear movement device such as a linear slide assembly, wherein the linear movement device comprises a guide member such as a rail unit 5 which has a first rail 51 on at least one side thereof. A body 6 is mounted to the rail unit 5. The body 6 has a second rail 61 which is located corresponding to the first rail 51. Two end caps 62 are respectively connected to two ends of the body 6. The end cap 62 provides at least one turning path 63 which has the first end thereof connected to the second rail 61. The second end of each turning path 63 is connected with a return-straight path 64. The second rail 61, the turning paths 63 and the return-straight path 64 form a circulation path "B". At least one closed guide groove "B1" is located in the circulation path "B".

When the rollers 2 in the holes 11 and the roller maintaining chain "A" move in the circulation path "B" of the linear movement device, the at least one side of the two sides of the elongate strip 1 is guided in the closed guide groove "B1" to ensure that the roller maintaining chain "A" moves on the correct position. By the rollers move along the first and second rails 51, 61, the body 6 can endlessly move along the first rail 51.

While we have shown and described the embodiment in accordance with the present invention, it should be clear to those skilled in the art that further embodiments may be made without departing from the scope of the present invention.

What is claimed is:

1. A roller maintaining chain comprising:

an elongate strip having multiple holes defined along an axial direction thereof, the holes being separated by separation blocks, each hole having a hole face which is defined between two adjacent separation blocks and perpendicular to the axial direction of the elongate strip, each separation block having a top separation block and a bottom separation block, each of the top and bottom separation blocks having an accommodating surface which is located adjacent to the hole, each of the accommodating surfaces of the top and bottom separation blocks having a flat surface and an inclined stop surface, a part of each of the accommodating surfaces of the top and bottom separation blocks being perpendicular to planes on the axial direction of the elongate strip, the flat surfaces of the top and bottom separation blocks smoothly connected to each other, the inclined stop surfaces of the top and bottom separation blocks being inclined toward a top direction of the holes.

2. The roller maintaining chain as claimed in claim 1, wherein the inclined stop surfaces of the top and bottom separation blocks are circular and curved surface.

3. The roller maintaining chain as claimed in claim 1, wherein the hole face is parallel to the axial direction of the elongate strip.

4. A method for making the roller maintaining chain as claimed in claim 1, wherein a left mold and a right mold has a first molding portion which inclinedly and laterally splits toward hole faces of the elongate strip so as to form a first splitting direction which is located between a vertical plane that is perpendicular to the axial direction of the elongate strip and a transverse plane which is transverse to the axial direction of the elongate strip, the first molding portions have opposite splitting directions and are respectively connected to the second molding portions, the assembly of the first and second molding portions is molded by way of injection molding, the first molding portions respectively form the accommodating surfaces of the top separation block and the bottom separation block, the holes and partial shape of the roller maintaining chain, the second molding portions form the rest of the shape of the roller maintaining chain, the first molding portions form a parting line at the holes, an inclined angle of the parting line is not less than an inclined angle of a diagonal line of the cross sectional area of the holes of the elongate strip, an inclined angle of the first splitting direction of the first molding portions is larger than the inclined angle of the parting line.

5. The method as claimed in claim 4, wherein the inclined angle of the first splitting direction of the first molding portions is smaller than an inclined angle of a side of the elongate strip of the roller maintaining chain that is located corresponding to the second molding portions, the second molding portions are integrally connected to the first molding portions.

6. The method as claimed in claim 5, wherein the parting line of the first molding portions is located on the same plane of a side of the elongate strip that is located corresponding to the first molding portions.

7. A linear movement device for the roller maintaining chain as claimed in claim 1, wherein the linear movement device comprises a guide member which has a first rail on at least one side thereof;

a body is mounted to the guide member, the body has a second rail which is located corresponding to the first rail, two ends of the second rail are respectively connected to a first end of a turning path, a second end of the turning path is connected with a return-straight path, the second rail, the turning path and the return-straight path form a circulation path, at least one closed guide groove is located in the circulation path, and at least one of the two sides of the elongate strip of the roller maintaining chain is located in the at least one closed guide groove, the holes of the roller maintaining chain each have a roller, the roller maintaining chain and the rollers are movable in the circulation path.

* * * * *